United States Patent [19]

Rosswurm et al.

[11] 4,342,076
[45] Jul. 27, 1982

[54] TRANSISTOR TURN OFF CURRENT SENSING CIRCUIT

[75] Inventors: Mark A. Rosswurm, Ada; Joseph M. Urish, Shawnee Township, Allen County, both of Ohio

[73] Assignee: Westinghouse Electric Corp., Pittsburgh, Pa.

[21] Appl. No.: 233,722

[22] Filed: Feb. 12, 1981

[51] Int. Cl.³ .......................................... H02M 7/537
[52] U.S. Cl. ..................................... 363/56; 363/132; 363/134
[58] Field of Search ................................. 363/24–26, 363/17, 56, 97, 134, 132; 323/289; 307/280

[56] References Cited

U.S. PATENT DOCUMENTS

| | | | |
|---|---|---|---|
| 3,305,761 | 2/1967 | Heinrich et al. | 363/132 |
| 3,412,316 | 11/1968 | Kernick | 363/134 |
| 3,670,234 | 6/1972 | Joyce | 363/134 |
| 3,683,208 | 8/1972 | Burens | 363/134 |
| 3,715,648 | 2/1973 | Kernick et al. | 363/134 |

Primary Examiner—William H. Beha, Jr.
Attorney, Agent, or Firm—G. H. Telfer

[57] ABSTRACT

A transistor current sensing circuit is provided for a power output transistor whose drive circuit includes a current controlled feedback transformer that has a current limited direct current source connected to the secondary winding of the transformer wherein the change in voltage level of the secondary winding upon the completion of turn-off of the output transistor is used as a signal to initiate turn-on of another associated transistor.

5 Claims, 3 Drawing Figures

TRANSISTOR TURN OFF CURRENT SENSING CIRCUIT

BACKGROUND AND SUMMARY OF THE INVENTION

This invention relates generally to power transistor switching circuitry. In particular, the invention has to do with transistors in the power stage of apparatus such as inverters that are driven by a current controlled feedback transformer.

A known way of controllably and reliably applying base drive current to transistors operating in a high current, switching mode is by the use of a current controlled feedback transformer (CCFT). The CCFT delivers base drive current from a base drive winding and also has a current feedback winding that provides positive feedback permitting more definite control over the magnitude of base drive current supplied. Among applications in which the current controlled feedback transformer has found favor is in inverters for conversion of direct current to alternating current power. Representative examples of such apparatus may be found in the descriptions of the following patents which are herein incorporated by reference: Heinrich et al. U.S. Pat. No. 3,305,761, Feb. 21, 1967; Kernick U.S. Pat. No. 3,412,316, Nov. 19, 1968; and, Kernick et al. U.S. Pat. No. 3,715,648, Feb. 6, 1973.

One aspect of the application of a CCFT in a power inverter is that the output circuit comprises a pair of power transistors that are to be alternately gated on to derive a desired alternating current output at their common pole output terminal. Basically, the intention is to have one transistor on during a given period corresponding to the desired AC half cycle and conducting from the high or positive DC voltage terminal to the pole output with an abrupt shift at the end of that time period to conduction of the other transistor from the negative or low voltage DC voltage terminal to the pole output terminal. A difficulty with this is that bipolar transistors require a finite time for both turn-on and turn-off and it is the case that commercially available power transistors are characterized by a longer turn-off time than turn-on time. To get a relatively clean output characteristic, conduction of one of the transistors should not occur until the other is fully turned off. Moreover, a shoot-through current, or cross-conduction current, from one transistor to the other when both are on not only degrades the output waveform but may cause catastrophic failure of the transistor that is going through the time required for turn-off.

The art has recognized the problem of shoot-through currents and has devised various means for their avoidance. These involve the provision of an overlap circuit, so designated because its function is to prevent overlap in the conduction of the two transistors, that can allow for the difference in turn-on and turn-off times and can inhibit turn-on of one transistor until the other transistor has completed its turn-off. The overlap circuit can provide a fixed time delay in the application of a turn-on signal. This fixed time delay must be sufficient to permit full turn-off under all operating conditions. Such a delay can introduce significant distortion in the output waveform particularly in high frequency, pulse width modulated inverters. Another technique, not subject to such limitations, is to provide a monitoring circuit that senses the magnitude of an output transistor's current and more precisely permits initiation of turn-on of the other transistor when the first is off.

A general schematic, in simplified form, of a portion of a power inverter with a current monitoring technique in accordance with prior practice is illustrated in FIG. 1. One of pair of power output transistors, designated element 10, is connected between positive direct voltage terminal 12 and the pole output terminal 14. The other of the pair of power output transistors is not shown but would be connected between a negative direct voltage terminal and pole output terminal 14. The circuitry illustrated with transistor 10 in FIG. 1 is substantially duplicated in the unillustrated circuitry for the other power output transistor.

In the illustrated half of the circuit transistor 10 is associated with a CCFT 16 that provides turn-on and turn-off base drive signals that are supplied to the base of the transistor 10 through a base drive winding 18 with a current feedback winding 20 for positive control. The other side of the CCFT 16 is supplied from a direct current source 22 that is current limited and is applied to the center tap of winding 24. Controlled frequency pulses applied to turn-on and turn-off terminals 25 and 26, respectively, initiate conduction of respective control transistors 27 and 28 at those terminals. These current paths determine the application of current from the current source 22 through respective parts of the winding 24 that result in turn-on and turn-off base drive to the output transistor 10. In this scheme, current monitoring is achieved by a resistor 30 connected in the circuit including winding 24 and "turn-on" transistor 28. A current detector 32 senses the current across resistor 30 and provides a signal on line 34 that is used to control signals to the other output transistor's circuit, i.e., to inhibit the application of a turn-on signal in the other half circuit until transistor 10 is fully off and the sensed current falls to zero.

In operation, when transistor 10 is turning off, its current is reflected through the CCFT 16 and flows through the sensing resistor 30. When this current decays to zero, it indicates that the carrier sweep-out period for the output transistor 10 has been completed and the transistor 10 is off. Until that event, the other output transistor is inhibited from turning on. Current and voltage values can be suitably selected for proper operation. For example, the current source can be implemented from a +28 volt DC supply with a current limit level of 100 milliamperes. The current through the sensing resistor 30 may reach about five amperes at maximum output current and deliver a voltage of less than about 500 millivolts for proper operation.

In practical application, an inverter with a monitoring circuit as shown in FIG. 1 functions properly when the current detector circuit 30-32 is physically close to, say within about five feet (1.5 m.) of, the inverter output transistor 10. The physical proximity is important because an increase of the length of conductive leads inherently creates an increased probability that the current sensing will be affected by noise signals and will not function properly. Such considerations are particularly significant in applications such as inverters for aircraft power systems.

There is increasing interest in having aircraft power generated by an AC generator directly from an engine running at a variable speed and then modifying the output of the generator by static power conversion equipment such as a rectifier and inverter system to achieve the desired output AC power. In one specific application for an aircraft inverter power system, a requirement to be met is that the control circuitry be located a distance of 35 feet (10.5 m.) from the CCFT's and output transistors. This happened to be necessary in order to keep the control circuitry at a location where it could be adequately cooled, while the inverter transistors and CCFT's could sustain a higher temperature. The 35 feet or more of conductive leads required between these segments of the system must pass through an environment of high electrical noise and, therefore, the resistive monitoring method of FIG. 1 would not be suitable. It is therefore a purpose of the present invention to provide an alternative current monitoring system for power inverters such as those generally illustrated by FIG. 1, or other applications of CCFT driven transistor switches, so that the proper functioning of the current detection circuit is independent of the distance between the control circuitry and the major elements of the power inverter, or the CCFT and power switches.

In brief summary, the present invention achieves this objective by doing without a resistive current sensor and instead sensing a voltage which changes as a result of transistor turn-off. The output transistor's current can be indirectly sensed by monitoring the output voltage of the current limited source to the CCFT or another voltage that similarly varies upon transistor turn-off. This requires no change to the CCFT and output transistor configuration from that which has previously been used. The effect relied on is to initiate turn-off by effectively shorting the secondary side of the CCFT (the side opposite that to which the output transistor are connected) as previously. This shorting of the secondary is reflected to the primary of the CCFT which shorts the voltage across the base emitter junction of the output transistor. As soon as the primary is shorted, the base current decreases and the output transistor enters the carrier sweep-out or turn-off period. During this time, collector current flows at a decaying rate and is reflected in the shorting current of the CCFT secondary. This shorting current will be greater than the current limited magnitude of the current source on the secondary side so that the output of the current source is shorted resulting in a sensed voltage of approximately zero volts. After carriers are fully swept from the base of the output transistor and it is off, the reflected output current in the CCFT secondary is reduced to zero. This removes the short on the current limited source and voltage rises to approximately its supply level. The occurrence of this rise in voltage signifies a turn-off of the output transistor and hence provides the signal that is used for controlling the application of a turn on signal to the other output transistor and prevents damaging shoot-through currents.

As can be seen, the inventive circuit does not require conduction of high currents through a long distance of cabling. Thus, signal wire size may be reduced and freedom from noise is provided. Further, the voltage that signifies the turn-off of the output transistor is a relatively high level signal, such as about 28 volts, which is sufficient to be unaffected by electromagnetic interference. Also, it is beneficial that the sensing circuitry can be located where the temperature environment is less extreme than that in which the inverter transistors are located.

DESCRIPTION OF THE PREFERRED EMBODIMENTS

Figure 1:
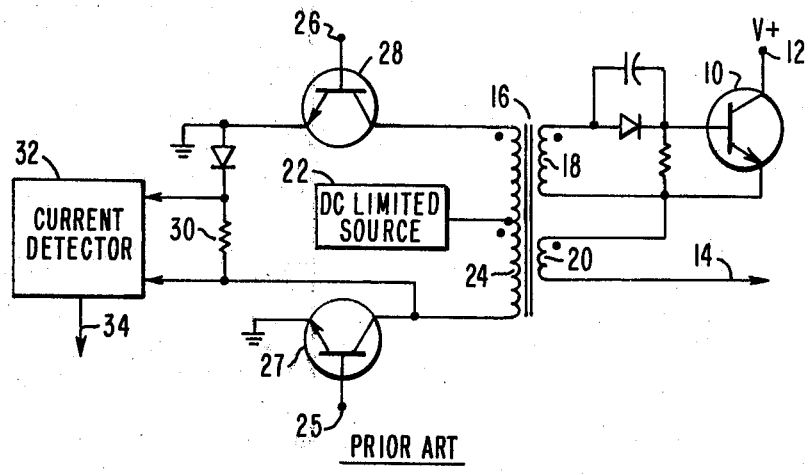
FIG. 1 is a generalized circuit schematic of a power inverter system with current monitoring in accordance with prior practice.

FIG. 1 is a prior art embodiment that has been discussed alone in the background portion of this specification.

Figure 2:
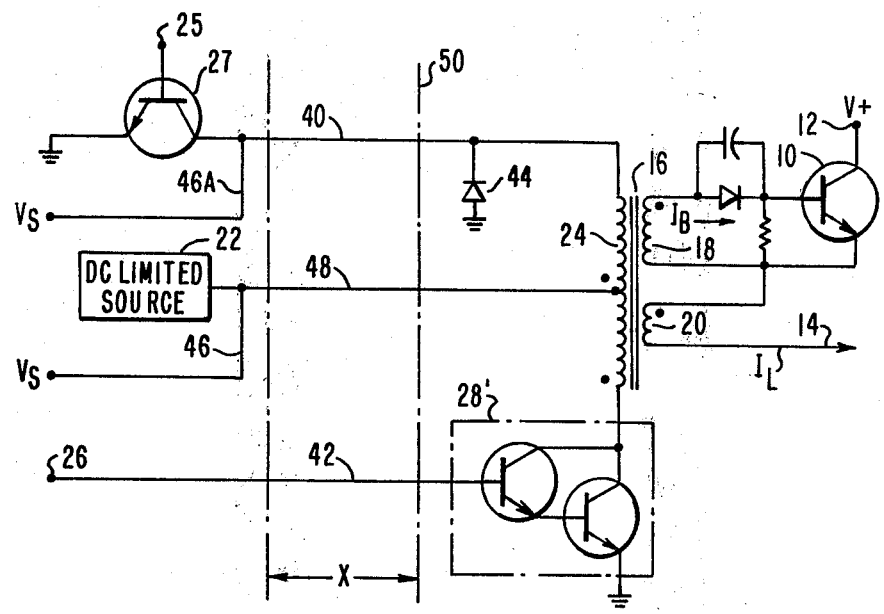
FIG. 2 is a general circuit schematic of a portion of a power inverter system with current monitoring in accordance with an embodiment of the present invention; and, FIG. 3 is a circuit schematic of a more specific embodiment of the present invention.

Referring to FIG. 2, a general representation of an embodiment of the present invention is shown that adopts for convenience a number of the elements as shown in FIG. 1 but with salient modifications in accordance with this invention. FIG. 2 illustrates the application of the invention to a single one of the output transistors of a pole of an inverter although it will be understood that its application to the other of the output transistors is assumed. The configuration of the connections of the output transistors 10 and CCFT 16 remain as shown in FIG. 1, however, it is to be understood that they may varied in accordance with prior practices relating to the use of CCFT's and switching mode transistors. In the description of FIG. 2, the right hand or output transistor side of the CCFT will be referred to as the primary side and the other side as the secondary side.

In this example, the secondary side of the CCFT 16 has a circuit including a turn-on terminal 25 at the base of a first control transistor 27 connected with its emitter collector path in circuit through conductor 40 with one end of the secondary winding 24. A turn-off terminal 26 is connected through another length of conductor 42 to a transistor or transistor combination 28' whose emitter collector path is connected to the other end of the secondary winding 24. A diode rectifier or commutating diode 44 is connected between the turn-on signal conductor 40 and ground. The working supply to the secondary side of the CCFT may be of the same sort as that previously used employing a DC limited source 22. Here, however, the voltage level $V_s$ of the source 22 is at terminal 46 of the supply and this voltage signal as an indication of output current $I_L$ is applied to the drive circuit of the transistor in the other part of the output stage to prevent the turn-on of that transistor until transistor 10 is totally off.

In operation, a turn-on signal at the turn-on terminal 25 of the illustrated portion of the system is implemented to turn on the output transistor 10 in the manner previously indicated. More significantly is the nature of the operation upon the application of a turn-off signal at the turn-off terminal 26. Assuming certain specific circuit values for purposes of example, the primary base drive winding 18 of the transformer 16 has eighteen turns while the current feedback winding primary winding portion 20 has three turns while on the secondary side a total of 216 turns are provided overall with a center tap connected to the current limited supply 22 through conductor 48. The suply 22 is one which is derived from a +28 volt DC source. Assuming that at a given instant the output transistor 10 is on and the output current is high, say 100 amperes, then from the turns ratio of the transformer, the base current $I_B$ is 16.6 amperes. While such condition prevails, a turn-off signal is applied at the turn-off terminal which is a signal sufficient to turn on transistor 28'. Transistors 28' and diode rectifier 44 effectively short out the secondary winding 24 when 28' is on because of the current path through 28' to ground and from ground through diode 44. This shorting of the secondary 24 to result in an effectively zero voltage across it is reflected to the primary side of the transformer which shorts the voltage across the base-emitter junction of the output transistor 10. This results because the shorting path on the secondary side is of lower impedance than the path through the primary winding 18. As soon as the primary winding 18 is shorted, the base current of the output transistor 10 decreases and the transistor enters the carrier sweep-out or turn-off period. The residual current, flowing because carriers cannot be swept out instantaneously, is reflected in the shorting current of the transformer secondary 24. This secondary shorting current is required for purposes of the present invention, but will not impose any additional systems requirement over conventional systems, to be greater than the current supplied by the current limited source 22, such as 100 milliamperes. This inherently results because the reflected current magnitude for an output current of 100 amperes will be approximately 3 amperes for the CCFT described. The reflected current on the secondary results in the output of the current limited source 22 to be shorted and the sensed voltage Vs drops to approximately zero. As the output current $I_L$ in the output transistor 10 continues to decay, it will upon completion of carrier sweep-out reach zero, at which time the short on the current limited source is removed and the sensed voltage Vs rises to substantially the source voltage of +28 volts. This rise in the sensed voltage Vs that occurs as a result of change of the current conduction of the output transistor 10 provides a digital type of indication of completion of turn-off of the output transistor 10. Upon the occurrence of this rise in output sensed voltage Vs the turn-on of the other transistor of the power pole is permitted with avoidance of damaging shoot-through currents.

As shown in FIG. 2, the arrangement may be such that conductors 40, 42 and 48 have an arbitrary length of about 35 feet or more be provided between the CCFT 16 and the current limited source 22 and the turn-on and turn-off terminals 25 and 26 of the control circuitry. Yet this large amount of conductor length is not a detriment because all that is required is to sense the voltage across the current limited source 22 as it changes from a substantially zero level to a substantially much higher level such as +28 volts which is an occurrence which can be safely determined without regard for stray noise.

FIG. 2 shows at lead 46A an alternative place from which to derive the signal $V_s$ which indicates turn-off of transistor 10. Lead 46A is connected to the lead 40 between the collector of transistor 27 and the cathode of commutating diode 44. The voltage on lead 40 shows also the step change upon turn-off as occurs from lead 46 connected directly to the current limited source 22. Briefly, the turn-on transistor 27 is off during the turning off of transistor 10. When transistor 10 is fully off, and the secondary of the CCFT becomes unshorted, the voltage at the collector of transistor 27 (or the cathode of diode 44) will promptly rise. In both instances, with either sensing at 46 or 46A, it is the abrupt change of a voltage of the secondary winding 24 that is being monitored and is immune from stray noise.

Figure 3:
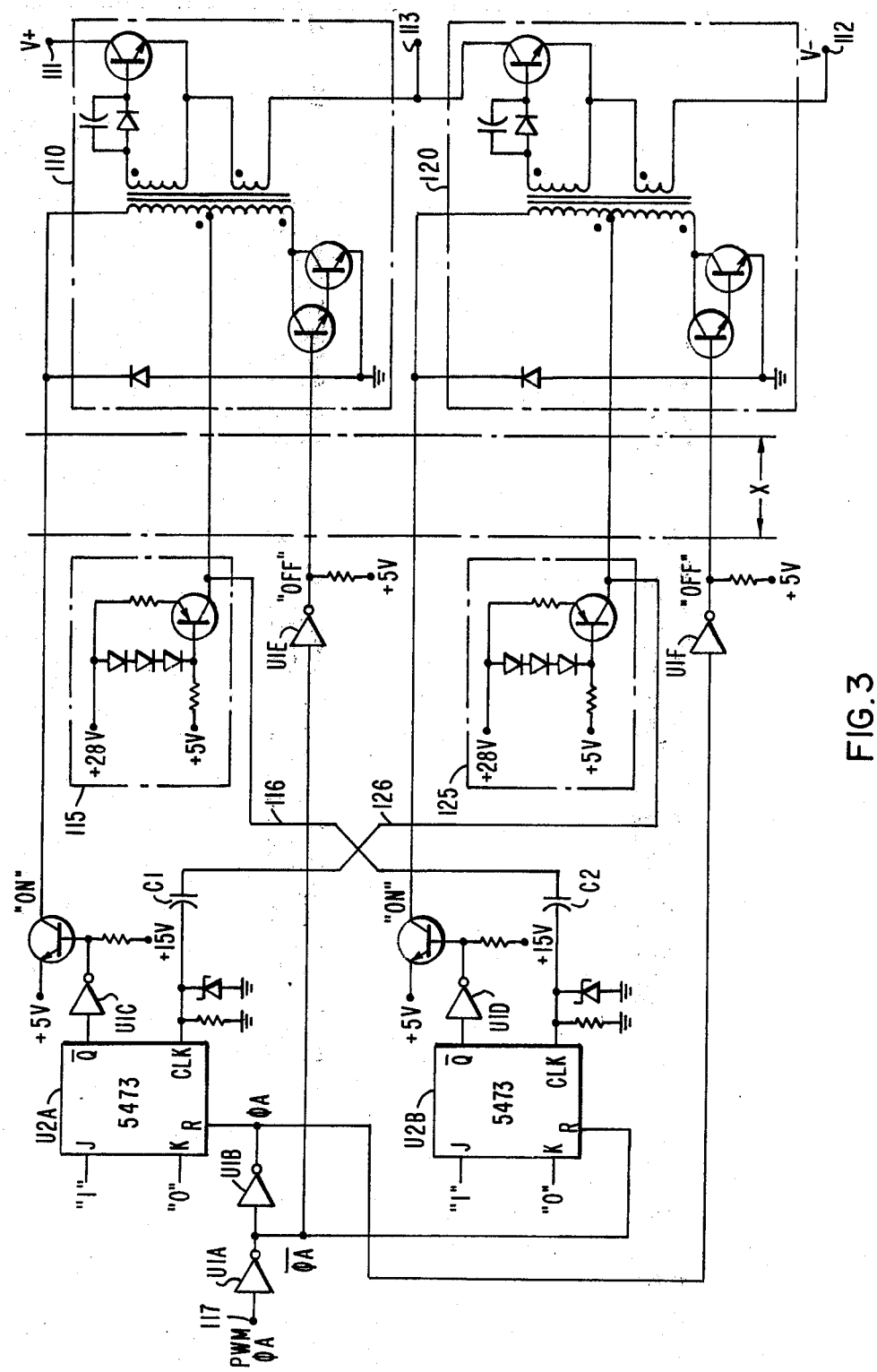

While the essential principles of the invention are believed to be made apparent from the foregoing description, a further embodiment of the invention is presented in FIG. 3.

In FIG. 3 an inverter is shown which includes upper and lower CCFT driven output transistor circuits 110 and 120. Each of the output transistor circuits 110 and 120 is substantially in accordance with the elements shown in FIG. 2 that are on the right side of the dashed line 50 of FIG. 2 with the output transistors differently connected for their relation between the positive and negative DC terminals 111 and 112, respectively, and the pole output terminal 113.

Each transistor circuit 110 and 120 has connected with it a DC limited source 115 and 125 which includes, by way of example, the transistor and associated circuit elements shown therein. The voltage signal that is sensed as an indication of output transistor current, per the above description of the operation of the FIG. 2 embodiment, appears respectively on lines 116 and 126 for the respective current sources 115 and 125.

An example of the utilization of of these signals will now be further described, all of which relates to one phase of a multiple phase system. At the input terminal 117 there is supplied a pulse width modulated signal PWM $\phi$A from a pulse width modulated waveform generator that serves to control the operation of the two portions of the illustrated circuit for conduction of the upper transistor when the pulse width modulated signal is positive and conduction of the lower transistor when the pulse width modulated signal is negative. The signal from the waveform generator is applied through buffer amplifiers U1A and U1B that are open collector inverting buffers that are used to buffer the PWM signal from the PWM wave form generator which is applied at terminal 17. When U1B goes high, logic circuit U2B is reset which causes the lower transistor to turn off in circuit 120 and to short the transistor in the current limited source 125. When U1B goes high, the reset is removed from logic circuit U2A.

When the current in the lower output transistor of circuit portion 120 decays to zero, the short is removed from the transistor in current source 125 and its collector voltage on line 126 rises to 28 volts. This rise in voltage is coupled by capacitor C1 to the clock input of U2A. The rising edge clocks a logic zero to the output of U2A which turns on the upper output transistor in circuit portion 110. The upper transistor cannot turn on until the lower transistor has turned off and a signal has been applied on line 126 which prevents shoot through currents. On the other hand, when U1B goes low, the turn-off sequence for the upper transistor is initiated and turn-on of the lower transistor is inhibited until the upper transistor turn-off is completed.

The logic circuits for U2A and U2B are, for example, integrated circuits of the type commercially available as #5473. The open collector inverting buffer amplifiers U1A, U1B, U1C, U1D, U1E, and U1F may all be an integrated circuit of the type that is commercially available as type #5406.

The two vertical dashed lines in FIG. 3, as in FIG. 2, may contain an arbitrary length of conductors between the inverter portion of the system to the right and the control portion of the system to the left. The key voltage signals developed on lines 116 and 126 to show turn-off of the respective transistors are not impaired by a large spacing of the system portions and shoot through currents between the output transistors are successfully avoided.

Various other forms of the invention will be apparent from the embodiments disclosed herein.

What we claim is:

1. Power transistor circuitry with current sensing comprising:
   a first output transistor connected to control conduction between an input terminal and an output terminal;
   means for selective application and removal of base drive current to said output transistor, said means comprising a current controlled feedback transformer, said current controlled feedback transformer having a secondary winding with a tap connected to a current source;
   means for monitoring the voltage of said secondary winding as an indication of the current conducted by said output transistor, said voltage exhibiting a change from a first low level to a second higher level upon the completion of the turn-off period of said output transistor;
   and means for initiating a turn-on base signal for a second output transistor in response to said change in voltage of said output voltage of said current source.

2. Power transistor circuitry in accordance with claim 1 wherein:
   said first and second output transistors are connected together as current controlled feedback transformer driven output transistors of a pole of a power inverter; and
   each of said output transistors have a current source connected with its transformer's secondary winding and the voltage of each said secondary winding is applied to control logic circuitry to initiate turn-on of one of said transistor when said voltage rises abruptly.

3. Power transistor circuitry in accordance with claim 2 wherein:
   said output transistors and said current controlled feedback transformers are physically disposed in a location remote from the location of said current sources and said control logic circuitry.

4. Power transistor circuitry in accordance with claim 1 wherein: said means for monitoring the voltage of said secondary winding comprises a lead connected directly to the output of said current source.

5. Power transistor circuitry in accordance with claim 1 wherein: said means for monitoring the voltage of said secondary winding comprises a lead connected to the end of said secondary winding.

* * * * *